United States Patent [19]
Kramer et al.

[11] Patent Number: 5,366,188
[45] Date of Patent: Nov. 22, 1994

[54] SUPPORT FOR SHEAVES OF PIPE

[75] Inventors: Rudolf Kramer; Friedrich Gütlhuber, both of Metten; Ludwig Brandl, Deggendorf, all of Germany

[73] Assignee: Deggendorfer Werft und Eisenbau GmbH, Deggendorf, Germany

[21] Appl. No.: 54,817

[22] Filed: Apr. 28, 1993

[30] Foreign Application Priority Data

May 5, 1992 [EP] European Pat. Off. ........ 92107549.5

[51] Int. Cl.[5] .............................................. F16L 3/22
[52] U.S. Cl. .................................................. 248/68.1
[58] Field of Search .............. 248/68.1, 69, 49, 65; 59/80

[56] References Cited
U.S. PATENT DOCUMENTS

| | | | |
|---|---|---|---|
| 2,902,821 | 9/1959 | Kelly, Jr. .................. | 248/68.1 X |
| 4,160,477 | 7/1979 | Roffler ...................... | 248/68.1 X |
| 4,570,703 | 2/1986 | Ringsmuth et al. .......... | 248/68.1 X |

FOREIGN PATENT DOCUMENTS 0446683 9/1991 European Pat. Off. .............. 248/49

Primary Examiner—Ramon O. Ramirez
Attorney, Agent, or Firm—Karl F. Milde, Jr.

[57] ABSTRACT

A support for sheaves of pipe that prevents each pipe (4) individually and each sheaf as a whole from sagging. Each pipe extends through a more or less matching perforation. The support comprises at least two adjacent, parallel, and mutually attached disks (2 or 22) containing perforations (6 or 30) uniformly distributed at an angle of 60° and matching the outer cross-section of the pipe. Every nth perforation in every nth line along one of the major axes (8, 10, & 12 or 24, 26, & 28) of distribution is concentrically expanded into the vicinity of the (n-1)th surrounding perforations (6 or 30), wherein n=2 or 3. The particular expansions (14 or 30) in subsequent disks (2a & 2b or 22a & 22b) are displaced such that every expansion in one disk is coaxial with a perforation (6c or 30b) left in the other disk.

6 Claims, 6 Drawing Sheets

SUPPORT FOR SHEAVES OF PIPE

BACKGROUND OF THE INVENTION

The invention concerns a support for sheaves of pipe that prevents each pipe individually, and each sheaf as a whole, from sagging, wherein each pipe extends through a more or less matching perforation in a support disk.

Pipe supports of this type are employed for example in more or less elongated pipe-sheaf chemical reactors for catalytic processes, the tubes containing the catalyst and being penetrated by the reaction gas whereas they are surrounded, within the reactor shell, by a heat transfer medium, mostly in the form of a water, oil or salt bath. The individual pipes must be separated from one another and from the reactor jacket. Whereas the fluid that supplies and removes heat is forced essentially across the sheaf by baffles or similar structures in shorter packed reactors, efforts are usually made to ensure that it will flow along the pipes as unobstructed as possible in the more elongated models. The supports must accordingly not only be strong enough to hold the pipes but also open enough to allow the fluid through, especially in the vicinity of each pipe. In a case where the length of the reactor tubes is of the order of e.g. 20 feet, they have to be additionally supported somewhere between the two endwise tube plates yet this support is to interfere as little as possible with the mainly axial flow of the heat transfer medium along the tubes.

Previous attempts to comply with these requirements have usually involved supports comprising intersecting bunches of straight rods extending between the separate rows of pipe and then fastened together with lateral projections, openings, etc. Another approach involves enclosing the separate pipes in sleeves connected by short welded-in rods. Both solutions, however, are very labor intensive and almost impossible to use with sheaves of large numbers of close-together pipes.

SUMMARY OF THE INVENTION

A principal object of the present invention is accordingly to provide as an improved pipe support of the type initially described that will support at least just as much pipe and allow at least just as much fluid through as conventional supports while being substantially easier and more practical to manufacture and use even with large-diameter sheaves of many closely adjacent pipes.

This object, as well as other objects which will become apparent in the discussion that follows, are achieved, in accordance with the invention, by providing a support that comprises at least two adjacent, parallel, and mutually attached disks containing perforations uniformly distributed at an angle of 60° and matching the outer cross-section of the pipe. Every nth perforation in every nth line along one of the major axes of distribution is concentrically expanded into the vicinity of the (n-1)th surrounding perforations, wherein n=2 or 3. The particular expansions in subsequent disks are displaced such that every expansion in one disk is coaxial with a perforation left complete in the other disk.

In contrast to the conventional versions hereintofore described, the support in accordance with the invention can be manufactured entirely separate from the sheaves in the form of one or slightly more, and preferably two, perforated steel disks. Rows or bunches of pipe can easily be inserted into the finished and appropriately secured supports.

The "perforations" in the disks need not be round when finished. They can also be petalled when the material is strong enough.

For a full understanding of the present invention, reference should now be made to the following detailed description of the preferred embodiments of the invention as illustrated in the accompanying drawings.

DESCRIPTION OF THE PREFERRED EMBODIMENTS

Figure 1:
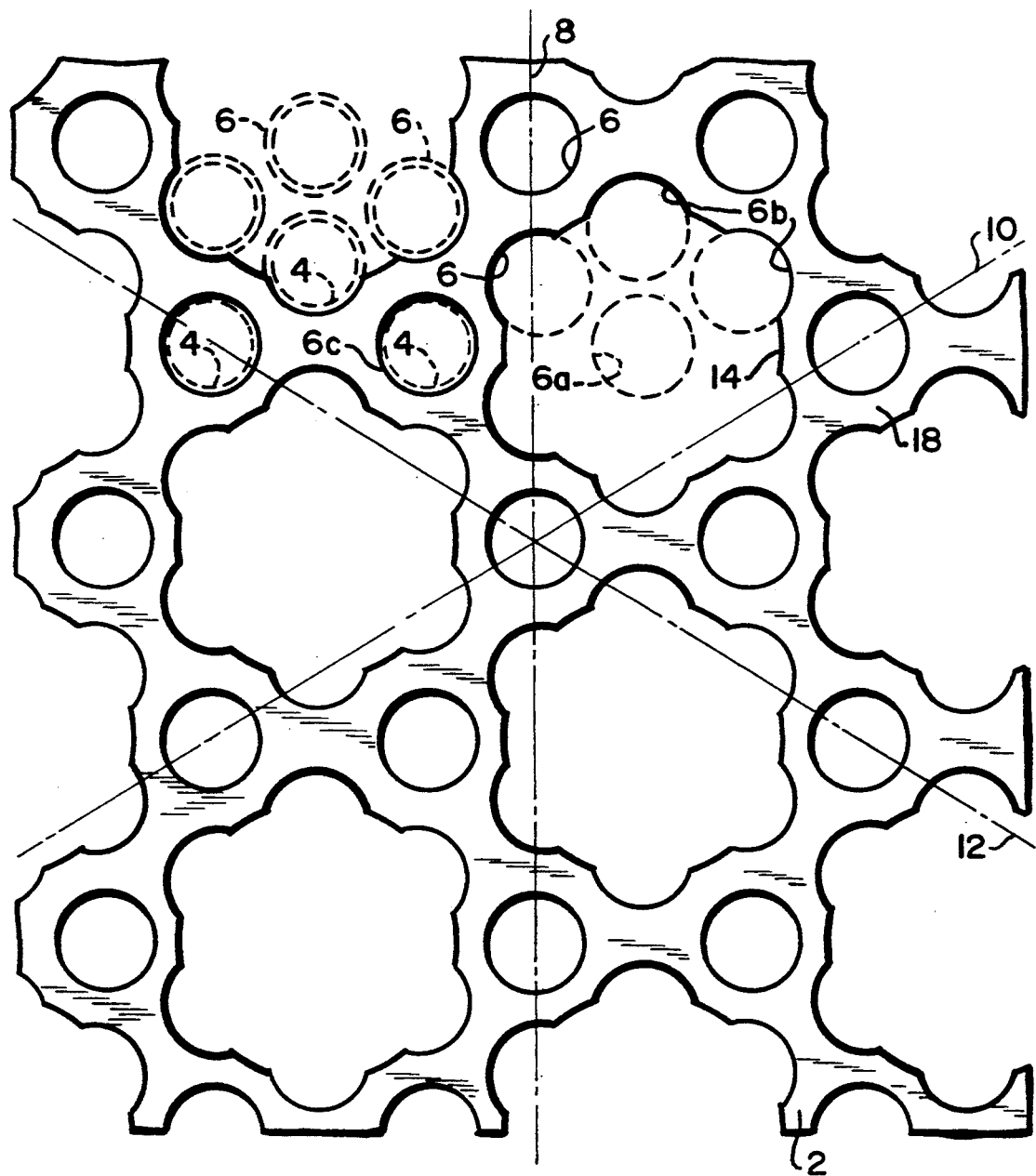
FIG. 1 is a top view of part of one of the disks in one preferred embodiment of the invention.
Figure 2:
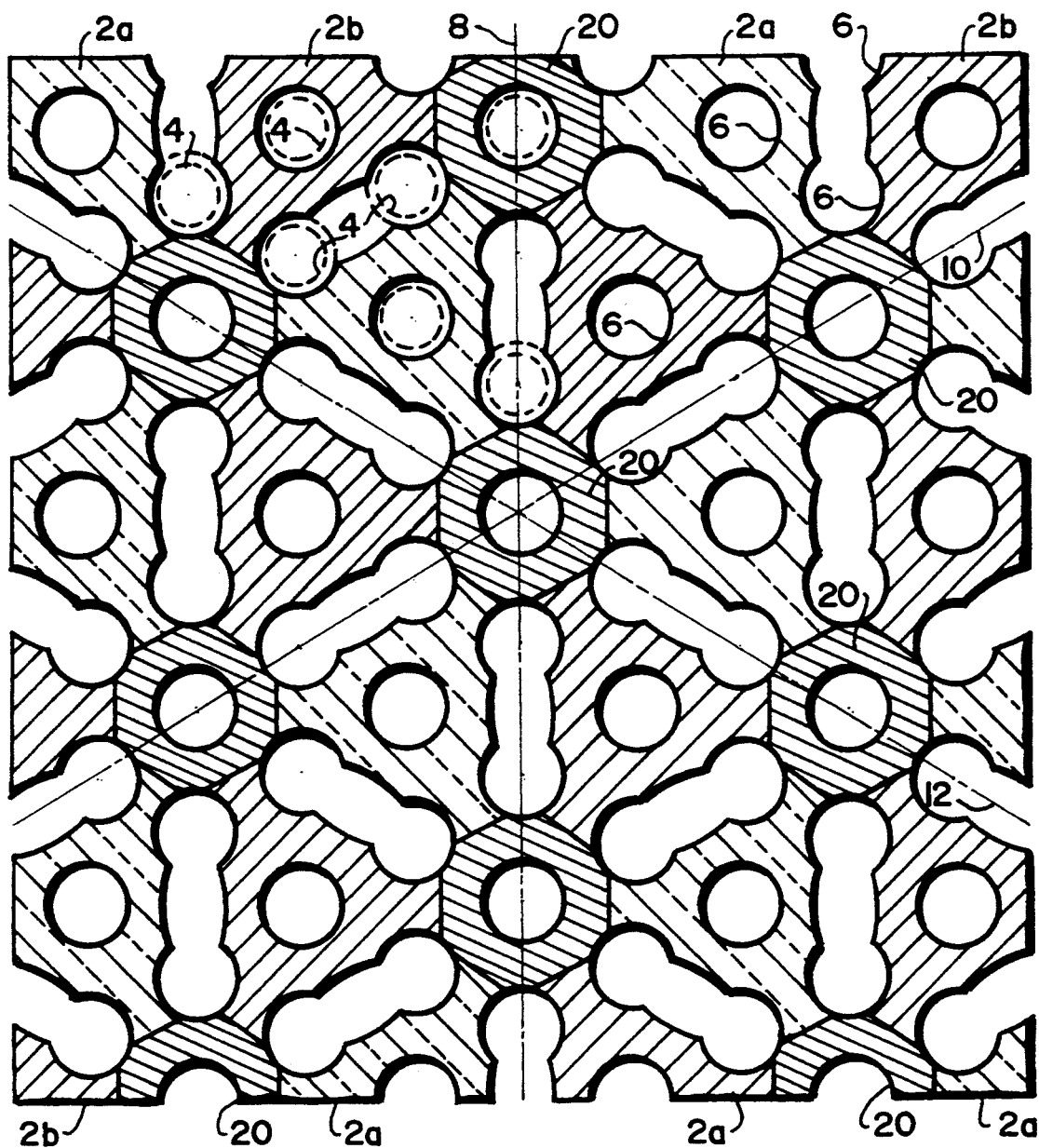
FIG. 2 is a similar view of part of a support comprising two differently hatched disks of the type illustrated in FIG. 1, whereby the forward disk is illustrated as transparent.

The embodiment illustrated in FIGS. 1 and 2 is preferred for relatively close-together pipes with interstices between the pipes measuring up to approximately half the diameter of the pipe.

FIG. 1 illustrates part of a disk 2 from such a support along with some of the pipes 4. As will be evident, pipes 4 and accordingly also the perforations 6 in disk 2 they extend through are distributed at the interval of 60°, as is conventional for sheaves of pipe, and as indicated by lines 8, 10, and 12 which represent the major axes of packing.

From consideration of the lines of pipe along any one of these major axes, the axis represented by line 8 for example, it will be evident that every third perforation 6 (perforation 6a) in every third line is concentrically expanded to approximately the center M of the perforations 6b around it, only part of which is accordingly left.

More precisely, the radial extension 14 extends to the vicinity of the next to next surrounding perforations 6c, meaning that it leaves a surrounding closed wall 16 as thick as the web 18 between succeeding perforations 6.

All such disks 2 in a particular support can be stacked together and have congruent perforations bored through them in a single process. The support will then be constructed by rotating one disk 2 in relation to the other to a certain extent, to that of one diameter for example, to produce the pattern represented in FIG. 2, and connecting the two disks together. As will be evident from that figure, all the pipes will, with extensions 14 left out of consideration, be enclosed in one of the two disks 2, at least along most of its circumference, in the support and will be secured in position. The support will accordingly provide a relatively ample thoroughfare, especially in the vicinity of each pipe, for the fluid to travel through and flow unconstricted along the pipes.

The hatching in FIG. 2 does not represent a truncation but only clarifies the relation between disks 2a and 2b and indicates such overlaps as area 20. The upper disk is drawn transparent for the same reason.

Figure 3:
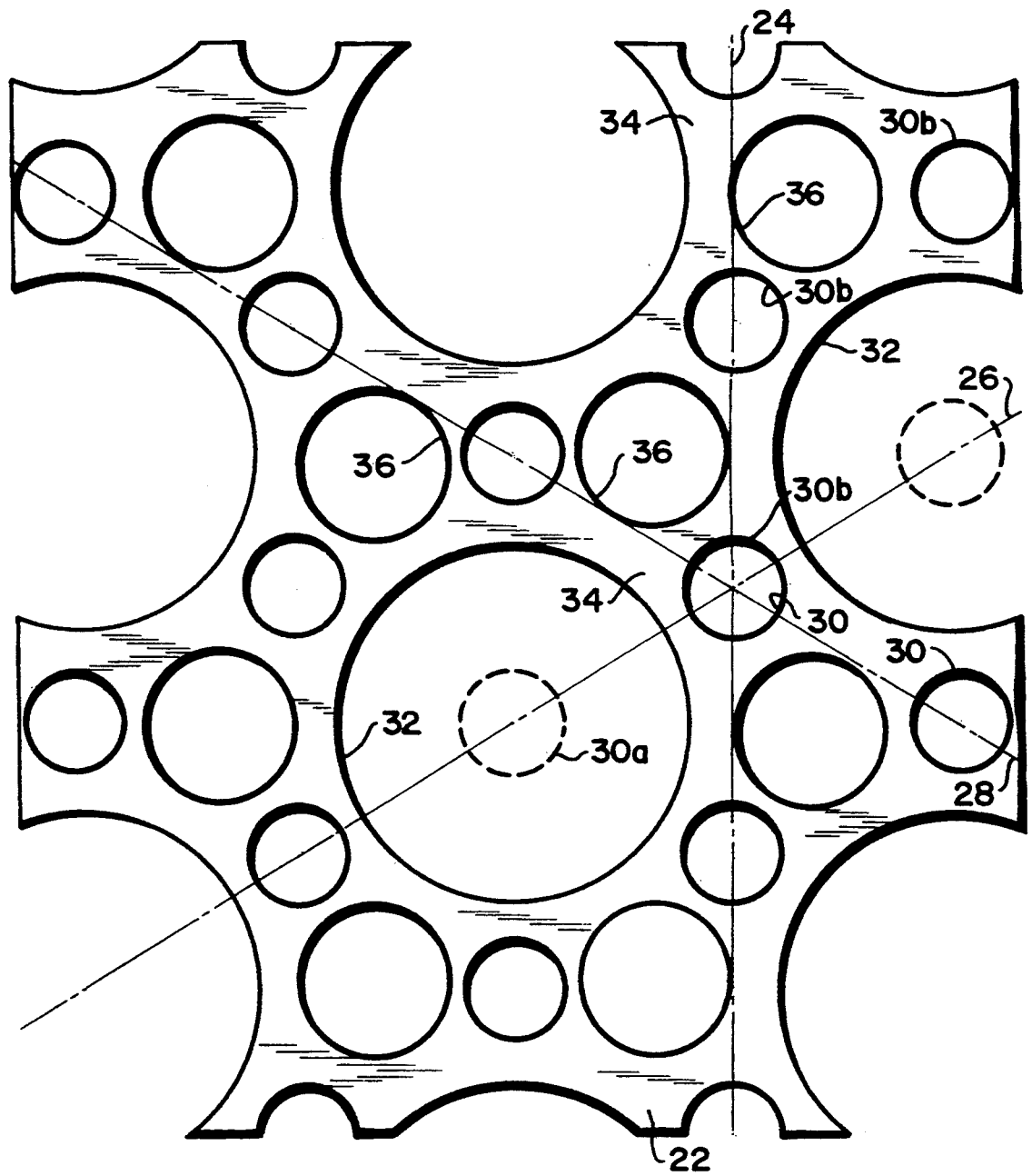
FIG. 3 is a top view of part of one of the disks in a second preferred embodiment of the invention.
Figure 4:
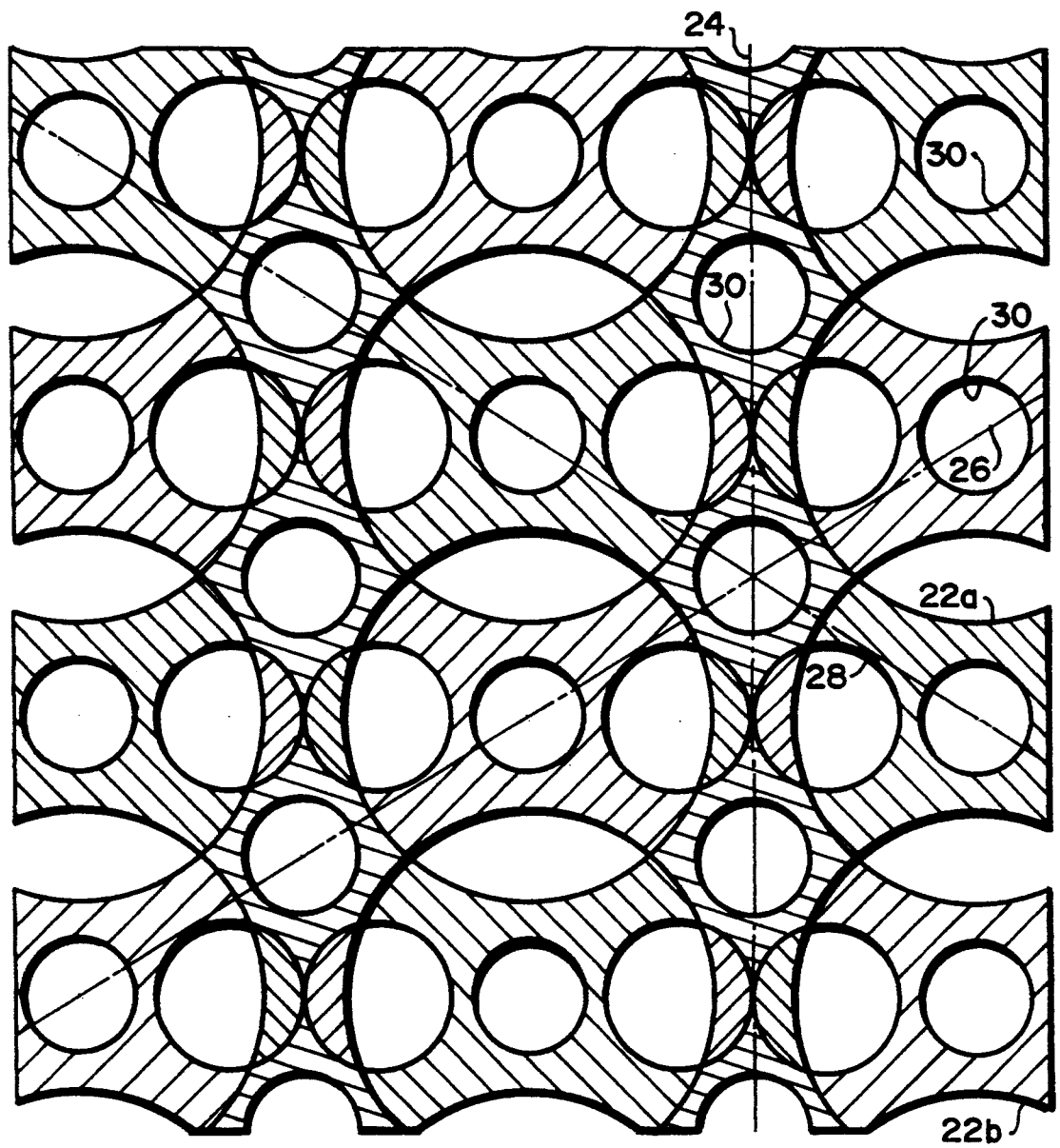
FIG. 4 is a view similar to that in FIG. 2 of part of a support comprising two disks of the type illustrated in FIG. 3.

The embodiment illustrated in FIGS. 3 and 4 is particularly appropriate for sheaves of pipe maintained relatively far apart due to a relatively wide inside cross-section that will be present even when disk 22a and 22b are in direct contact.

As will be evident from FIG. 3 each disk 22a and 22b, numbered 22 alone hereinafter, is obtained with a 60° pipe distribution along the major axes (lines 24, 26, and 28) of the pipe by concentrically expanding it along extensions 32 into the vicinity of the perforations 30b around it. Since the intermediate webs 34 allow it, additional perforations 36 have been produced at the center between every three perforations 30 and extensions 32 to increase the flow cross-section.

Two or more disks 22 can now be rotated to a particular angle and stacked as described with reference to disks 2 in the initial embodiment to obtain the support illustrated in FIG. 4.

Figure 5:
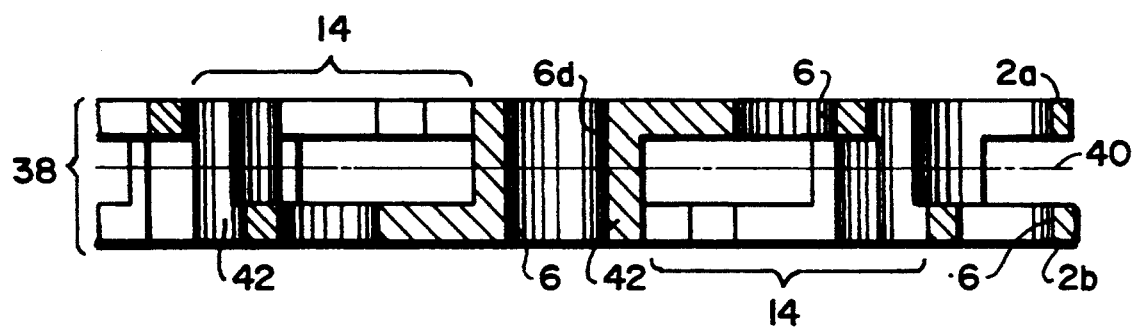
FIG. 5 is a section through part of the first embodiment of a support with integrated disks.

The disks 2 and 22 in each embodiment can on the other hand also be manufactured connected by boring or milling them to produce an already integrated component. One example is illustrated in FIG. 5. As will be evident, the support can be produced by boring perforations for all the pipes in an integrated plate 38 and milling the particular expansions 14 in from both sides alternatingly and across the midplane 40 of plate 38. The two accordingly manufactured disks 2a and 2b continue to be connected by area 42 of material around the integral-walled perforations 6d closed off by both disks together.

Figure 6:
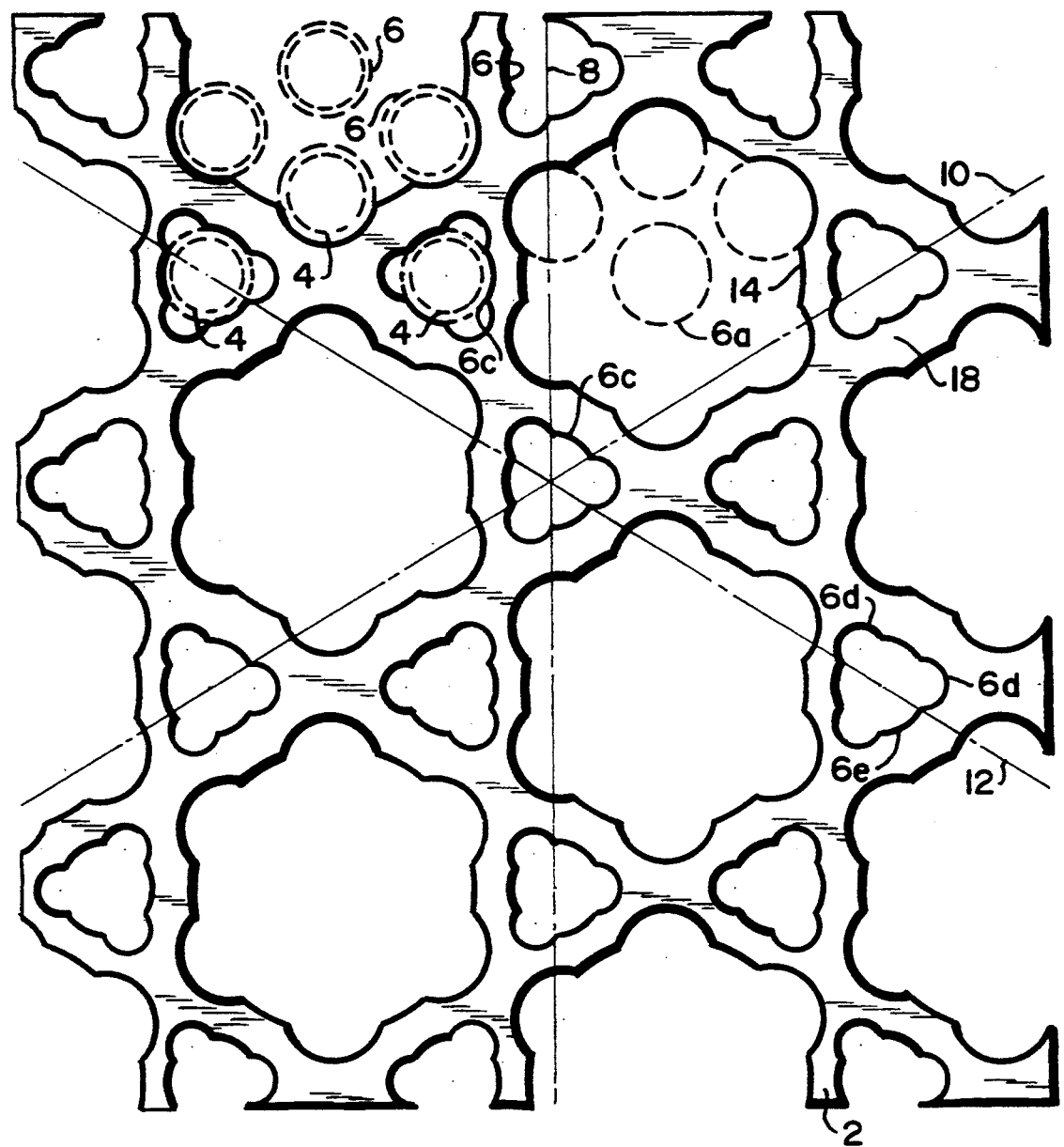
FIG. 6 shows part of a disk from the first embodiment but with different perforations.
Figure 7:
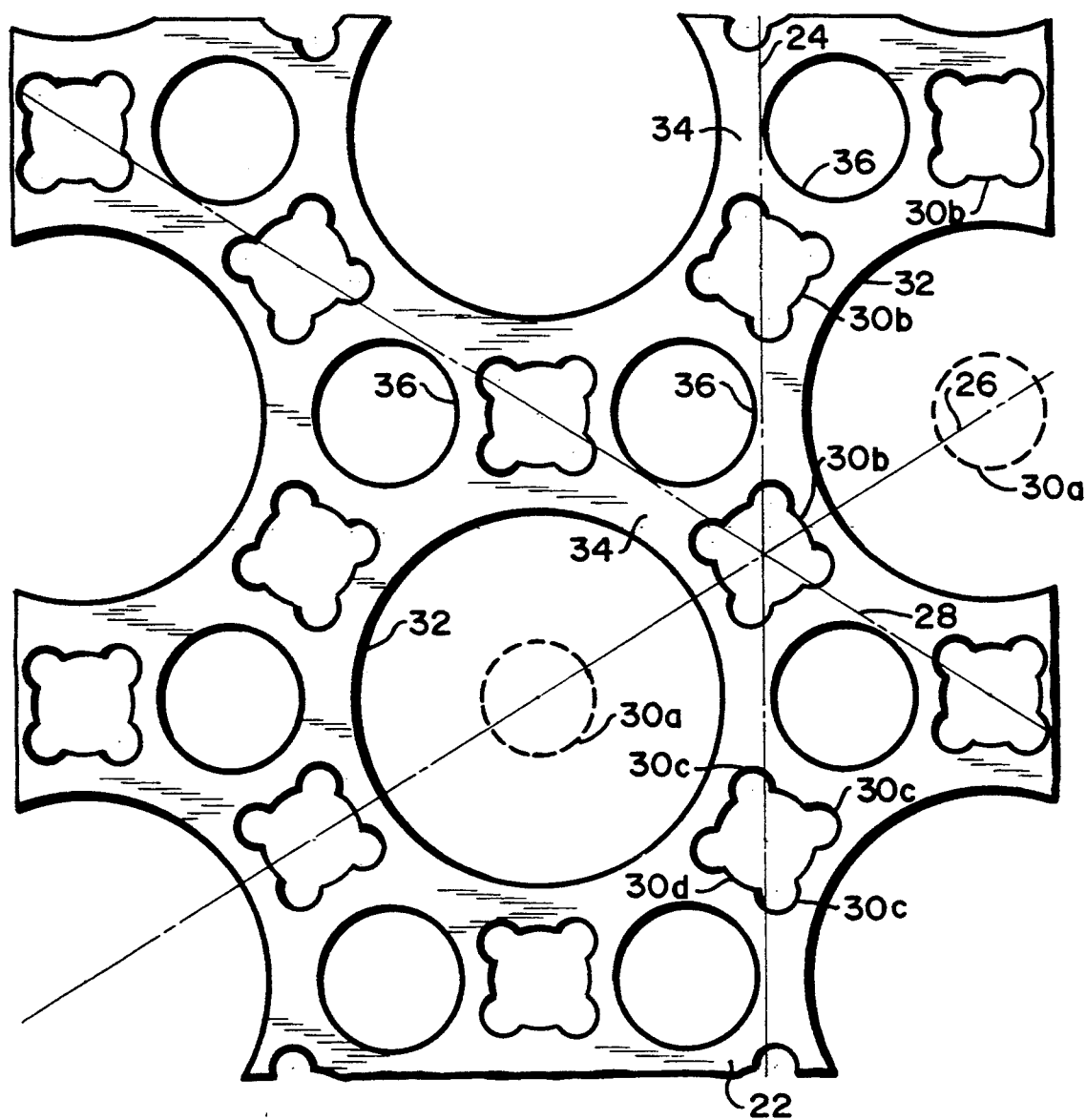
FIG. 7 shows part of a disk from the second embodiment but with different perforations.

FIGS. 6 and 7 illustrate, FIG. 6 with respect to the embodiment illustrated in FIGS. 1 and 2 and FIG. 7 to that illustrated in FIGS. 3 and 4, another way of expanding the flow cross-section of the support by providing the integral-walled perforations 6 and 30 in each disk with petal-like expansions 6d and 30c as can be done ahead of time by introducing a ring of smaller perforations, whereas the sections of perforations 6e and 30d assume the function of supporting the pipes.

There has thus been shown and described a novel support for sheaves of pipe which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. In a support for sheaves of pipe that prevents each pipe individually and the sheaf as a whole from sagging, whereby each pipe extends through a more or less matching perforation, the improvement comprising at least two parallel, and mutually attached disks containing perforations uniformly distributed at an angle of 60° and matching the outer cross-section of the pipe, thus forming three major axes Of distribution which intersect at an angqle of 60°, wherein every nth perforation in every nth line along one of said major axes of distribution of each disk is concentrically expanded into the vicinity of the (n-1)th surrounding perforations, with n=2 or 3, and wherein the particular expansions in subsequent disks are displaced such that every expansion in one disk is coaxial with a perforation left complete in the other disk.

2. The support defined in claim 1, wherein the number of mutually attached disks is 2.

3. The support defined in claim 1, wherein the mutually attached disks are attached by way of at least several areas of material around the coaxial perforations left complete in the disks and spanning the distance between the disks.

4. The support defined in claim 3, wherein the areas of spanning material have the same shape as the overlapping areas of disk around the particular coaxial perforations.

5. The support defined in claim 1, wherein at least the perforations left complete have petal-like expansions.

6. The support defined claim 1, wherein the webs between the perforations left complete in each disk, supportable in terms of strength, have additional perforations toward the axes of the perforations.

* * * * *